United States Patent
Matsui

(10) Patent No.: US 6,532,048 B1
(45) Date of Patent: Mar. 11, 2003

(54) DISPLAY DEVICE AND ELECTRONIC DEVICE USING THE SAME

(75) Inventor: Tsuyoshi Matsui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/646,968

(22) PCT Filed: Jan. 13, 2000

(86) PCT No.: PCT/JP00/00139

§ 371 (c)(1),
(2), (4) Date: Sep. 25, 2000

(87) PCT Pub. No.: WO00/46632

PCT Pub. Date: Oct. 8, 2000

(30) Foreign Application Priority Data

Feb. 1, 1999 (JP) ............................................. 11-023717

(51) Int. Cl.⁷ ............................................. G02F 1/1335
(52) U.S. Cl. .............................. 349/96; 349/74; 349/75; 349/76; 349/139; 349/97
(58) Field of Search ............................ 349/96, 74, 139, 349/75, 80, 106, 117, 76, 97

(56) References Cited

U.S. PATENT DOCUMENTS

| | | | |
|---|---|---|---|
| 5,325,218 A | * 6/1994 | Willett et al. | 359/53 |
| 5,831,375 A | * 11/1998 | Benson | 313/110 |

FOREIGN PATENT DOCUMENTS

| | | |
|---|---|---|
| EP | 0 652 460 A1 | 5/1995 |
| EP | 0 825 477 A2 | 2/1998 |
| EP | 0884622 | 12/1998 |
| EP | 0942313 | 9/1999 |
| JP | A-58-136080 | 8/1983 |
| JP | A-7-181914 | 7/1995 |
| JP | A-10-115828 | 5/1998 |
| JP | A-10-206844 | 8/1998 |

* cited by examiner

*Primary Examiner*—Kenneth Parker
*Assistant Examiner*—David Chung

(57) ABSTRACT

In realizing a new display technique for a display device for reliably producing icon displays of various designs and allowing displayed information to be easily grasped, and providing a display device which provides high visibility in an electronic device and the like, in order to obtain icon displays, display pattern portions 171, 172, and 173 are formed in an optical modulation layer 17, and control regions 114, 115, and 116 are formed in a liquid crystal panel 11 so as to overlap with the display pattern portions in a plane. In particular, the control regions 114, 115, and 116 are formed to be somewhat larger than icons so as to completely cover the icons and to include the icons with some extra space. This makes it possible to display icons without any trouble even when some pattern displacement in a planar portion is caused between the display pattern portions 171, 172, and 173 formed on a transmissive film 14 and the control regions 114, 115, and 116 of the liquid crystal panel 11.

10 Claims, 8 Drawing Sheets

DISPLAY DEVICE AND ELECTRONIC DEVICE USING THE SAME

BACKGROUND OF THE INVENTION

1. Field of the Invention

The present invention relates to a display device and an electronic device using the display device, and more particularly, to the structure of a display device using a transmitted light polarization axis changing device formed of a liquid crystal panel or the like.

2. Description of Related Art

Conventionally, liquid crystal display devices have been used in various recent electronic devices, such as portable telephones, portable music playback devices, timepieces, cameras, VTRs, microwave ovens, and telephones. Display sections of such electronic devices appropriately employ a text information display section for displaying characters, numerals, symbols, and the like by a combination of a plurality of dot regions or segment regions, and an icon display section for displaying icons, for example, predetermined patterns, such as illustrations, special symbols, and marks, by using exclusive one or more segment regions.

The text information display section adopts a dot matrix method in which various character information and the like can be freely rewritten and characters and the like are represented by a group of small dots, and a segment method, such as a seven-segment method for expressing numerals, in which characters and the like are expressed by a combination of a plurality of segments.

In contrast, the icon display section displays illustrations, symbols, words, and the like in a fixed manner, and displays information such as the settings and current situation of the electronic device and a warning to the user in a predetermined fixed form. Specific examples thereof are a display section of a portable device for displaying the remaining quantity of a battery in several stages (an illustration of a battery), a display section of a portable telephone for displaying the strength of radio waves in several stages (an illustration of a radio wave), a display section of an electronic timepiece for showing that the alarm has been set ("ALARM"), and a display section of a chronograph for showing that timing is stopped ("STOP").

In a conventional liquid crystal display device using, for example, a known TN or STN liquid crystal display panel, two polarizers are placed on the front and back sides of a liquid crystal cell in an orientation such that the transmitted-light polarization axes thereof are orthogonal to each other, the polarization axis direction of polarized light which has passed through one of the polarizers is changed or maintained according to the presence or absence of an electric field applied to a liquid crystal layer in the liquid crystal cell, and a light blocking state and a light transmitting state of the liquid crystal display panel are switched by causing the polarized light to be blocked by the other polarizer or to be passed therethrough. Since a display surface appears dark in the light blocking state of the liquid crystal display panel and light in the light transmitting state, various information can be displayed by using the dark and light colors.

In order to form an icon display section in the above display device using the liquid crystal display panel, however, transparent electrodes, reflecting electrodes, and the like formed on the inner surface of a panel substrate of the liquid crystal display panel must be formed in the shape of the icons. For this reason, when producing liquid crystal display panels having different icon forms, liquid crystal cells must be designed and produced for each icon. Even if the other portions, for example, text information display sections, remain just the same in structure, the panel structure cannot be commonly used. In this case, in order to form icons having fine patterns and lines and complicated icons using a plurality of colors, an electrode pattern also needs to have a fine structure. This makes production significantly difficult, and is not practical.

In contrast, another method is known in which constantly visible icons are formed on a panel substrate of a liquid crystal display panel by printing or by other methods, and a display for indicating the selection state of the icons is produced by the liquid crystal display panel as required. In this case, however, the icons are constantly displayed, and therefore, visibility is low. Moreover, the indication display is also required, and this occupies a large part of the display area.

SUMMARY OF THE INVENTION

In a liquid crystal display device having both a text information display section and an icon display section, since text information and an icon display or an icon indicating display are shown in the same color on the same background, they are completely harmonized. For example, an icon for drawing the user's attention is inconspicuous, and therefore, is not noticed by the user.

In particular, in the display sections of portable devices, such as portable telephones, portable CD players, and portable MD players, since multiple abstract and small icons are displayed in a small display area, it is difficult to grasp displayed information.

The present invention aims to solve the above problems, and an object of the present invention is to realize a new display technique for a display device for reliably producing icon displays of various designs and allowing displayed information to be easily grasped, and to provide a display device which provides high visibility in an electronic device and the like.

An exemplary embodiment provided by the present invention in order to achieve the above object is a display device including a transmitted light polarization axis changing device for changing the polarization axis of transmitted light in each control region, first and second polarization separating elements placed on both sides of the transmitted light polarization axis changing device, an optical modulation layer formed or placed in a predetermined modulation pattern on the side of the second polarization separating element opposite from the transmitted light polarization axis changing device, and a light reflecting layer placed on the side of the optical modulation layer opposite from the second polarization separating element, wherein the first polarization separating element emits a linearly polarized light component, polarized in a first direction, of light entering from the side opposite from the transmitted light polarization axis changing device toward the transmitted light polarization axis changing device, and emits a linearly polarized light component, in the first direction, of light entering from the transmitted light polarization axis changing device toward the opposite side, the second polarization separating element transmits a linearly polarized light component, in a second direction, of light received from the side of the transmitted light polarization axis changing element toward the optical modulation layer, reflects a linearly polarized light component, in a third direction different from the second direction, of the light received from the side of the transmitted light polarization axis changing device toward the transmitted light polarization axis changing device, and emits a linearly polarized light component, in the second direction, of light received from the optical modulation layer toward the transmitted light polarization axis changing device, a display pattern portion is formed at a position in the modulation pattern of the optical modulation layer corresponding to the control region in a plane, and the control region completely covers a region of the display pattern portion necessary as a display portion.

According to this embodiment, when external light enters the first polarization separating elements, a linearly polarized light component thereof in the first direction is transmitted therethrough and enters the transmitted light polarization axis changing device. The linearly polarized light component is caused to appropriately change the polarization axis by the transmitted light polarization axis changing device, and then enters the second polarization separating element. The second polarization separating element transmits a linearly polarized light component in the second direction of incident light, and reflects a linearly polarized light component in a third direction. Therefore, when the linearly polarized light component in the first direction is turned into a linearly polarized light component in the second direction by the transmitted light polarization axis changing device, the light passes through the second ploarization. When the linearly polarized light component in the first direction is turned into a linearly polarized light component in the third direction by the transmitted light polarization axis changing device, the light is reflected by the second polarization separating element. The light reflected by the second polarization separating element passes again through the transmitted light polarization axis changing device and the first polarization separating layer, and is emitted outside. In contrast, the light passed through the second polarization separating element is modulated by the optical modulation layer, is reflected by the light reflecting layer, passes again through the second polarization separating element, the transmitted light polarization axis changing device, and the first polarization separating element, and is emitted outside.

Accordingly, external light is reflected and emitted outside by the second polarization separating element, or modulated by the optical modulation layer and is reflected and emitted outside by the light reflecting layer, according to the control state of the control region of the transmitted light polarization axis changing device. Therefore, it is possible to switch the display in each control region depending on which optical path is selected. Since the region necessary for a display portion of the display pattern portion formed inside the modulation pattern of the optical modulation layer is completely covered by the control region, even when the pattern, shape, color, and the like of the display pattern portion are fine or complicated, the shape of the control region itself need not be fine or complicated. This eliminates the necessity to complicate the structure for forming the control region. As a result, the display pattern portion can be formed in an arbitrary pattern, color, or shape, and it is possible to easily form display contents that are easy to recognize and detect. Furthermore, the display pattern portion can be easily changed so as to provide a different display structure by replacing only the optical modulation layer without changing the control region.

In the above configuration, it is preferable that the transmitted light polarization axis changing device control the state of the control region so as to turn the linearly polarized light in the first direction into one of linearly polarized light in the second direction and linearly polarized light in the third direction. It is satisfactory as long as the light reflecting layer in the above configuration has a function of reflecting at least a part of incident light so as to contribute to display, and the light reflecting layer need not have a high reflectance for all the light. While it is most preferable that the second direction and the third direction be orthogonal to each other, the present invention is not limited thereto.

According to an exemplary embodiment it is preferable that the peripheral edge of the control region extend outside the peripheral edge of the display pattern portion in a plane in a direction to widen the region. According to this embodiment, since the peripheral edge of the control region extends outside the display pattern portion in a plane, extra space is formed by the extending portion. For this reason, even when pattern displacement in a planar direction is caused, between the transmitted light polarization axis changing device and the optical modulation layer, the display form of the necessary display portion of the display pattern portion is less prone to be influenced thereby, and the risk of display failure is reduced. As long as the shape of the display pattern portion is changed within a predetermined range, display remains unchanged because of the extra space obtained by the extending portion, and therefore, the modulation pattern of the optical modulation layer can be changed without changing the pattern shape of the control region.

According to another exemplary embodiment, it is preferable that a portion of the peripheral edge of the control region close to another control region be retreated in a plane from the peripheral edge of the display pattern portion in a direction to narrow the region, and that other portions of the peripheral edge of the control region other than the close portion extend in a plane outside the peripheral edge of the display pattern portion in a direction to widen the region. According to this embodiment, even when a plurality of control regions are close to one another, the distances therebetween become larger than the distance between corresponding display pattern portions at the close portions, and the control regions extend outside the display pattern portions at the portions other than the close portions. Therefore, it is possible to prevent control failure due to short-circuiting and mutual interference resulting from the close relationship between the control regions. Even when pattern displacement in a planar direction is caused between the transmitted light polarization axis changing device and the optical modulation layer, the display form of the necessary display portion of the display pattern portion is less prone to be influenced thereby, and the risk of display failure is reduced. As long as the shape of the display pattern portion is changed within a predetermined range, display remains unchanged because of the extra space obtained by the extending portion, and therefore, the modulation pattern of the optical modulation layer can be changed without changing the pattern shape of the control region.

According to another exemplary embodiment, it is preferable that a display form produced by emission of the linearly polarized light component in the third direction reflected by the second polarization separating element and a display form produced by emission of a linearly polarized light component in the second direction, which is not modulated by the optical modulation layer, but is reflected by the light reflecting layer, be substantially the same. According to this embodiment, even when the control region is formed to be larger than a display portion of a corresponding display pattern portion, a display form obtained by light reflected by the light reflecting layer in the control region on the periphery of the display portion of the display pattern portion and a display form obtained by light reflected by the second polarization separating element outside the control region are substantially the same, thereby improving display quality on the periphery of the display portion.

According to another exemplary embodiment, it is preferable that the light reflecting layer be formed of a third polarization separation element having the same structure as that of the second polarization separating element so as to reflect a linearly polarized light component in the second direction of light received from the side of the second polarization separating element toward the second polarization separating element. According to this embodiment, light is reflected and emitted outside by the second polarization separating element or the third polarization separating means according to the state of the control region. Since the second polarization separating element and the third polarization separating element have the same structure, the reflection form is substantially similar in both cases in which the linearly polarized light component in the third direction is reflected by the second polarization separating element and in which the linearly polarized light component in the second direction is reflected by the third polarization separating element. As a result, a display form obtained by light reflected by the second polarization separating element and a display form obtained by light reflected by the third polarization separating element are similar to each other.

In this case, it is preferable that the third polarization separating element be just the same as the second polarization separating element. When the second direction and the third direction are orthogonal to each other, it is preferable that the third polarization separating element be placed so that it is rotated by 90° on the optical axis relative to the second polarization separating element.

According to another exemplary embodiment, it is preferable that a light source be placed on the side of the light reflecting layer opposite from the optical modulation layer and that the light reflecting layer transmit at least a part of light received from the light source. According to this embodiment, since at least a part of light received from the light source is transmitted through the light reflecting layer, the transmitted light sequentially passes through the optical modulation layer, the second polarization separating element, and the transmitted light polarization axis changing device. In this case, according to the state of the control region of the transmitted light polarization axis changing device, when the linearly polarized light component in the second direction passed through the second polarization separating element is turned into a linearly polarized light component in the first direction in the control region, it is emitted outside via the first polarization separating element. When the linearly polarized light component in the second direction is turned into a linearly polarized light component in a direction substantially orthogonal to the first direction by the control region of the transmitted light polarization axis changing device, it is blocked by the first polarization separating element and is not emitted outside. Therefore, it is possible to partially display the display modulated by the optical modulation layer based on light from the light source even in a dark environment.

In this case, when the third polarization separating element is provided, it is preferable that the third polarization separating element reflect a linearly polarized light component in the second direction from the second polarization separating element and transmit a linearly polarized light component in the second direction from the light source. Therefore, for example, it is preferable to place the third polarization separating element so as to be rotated on the optical axis by a predetermined angle of less than 90° from a position for reflecting a linearly polarized light component in the second direction. The third polarization separating element may be automatically or manually rotated when display is viewed by external light and when display is viewed by light from the light source. In this case, the rotation angle is, for example, 90°.

According to another exemplary embodiment, it is preferable that a plurality of display pattern portions produce an integrated icon display by combining display portions thereof.

According to this embodiment, since an integrated icon display is produced in various forms by combining display portions of a plurality of display pattern portions, it is possible to selectively display a plurality of kinds of icons in the same region, to change the icon display form, and to activate the icon display.

There is provided a display device including a transmitted light polarization axis changing device for changing the polarization axis of transmitted light in each control region, first and second polarization separating element placed on both sides of the transmitted light polarization axis changing device, an optical modulation layer formed or placed in a predetermined modulation pattern on the side of the second polarization separating element opposite from the transmitted light polarization axis changing device, and a light reflecting layer placed on the side of the optical modulation layer opposite from the second polarization separating element, wherein the first polarization separating element emits a linearly polarized light component, polarized in a first direction, of light entering from the side opposite from the transmitted light polarization axis changing device toward the transmitted light polarization axis changing device, and emits a linearly polarization component, in the first direction, of light entering from the transmitted light polarization axis changing device toward the side opposite from the transmitted light polarization axis changing device, wherein the second polarization separating element transmits a linearly polarized light component, in a second direction, of the light received from the side of the transmitted light polarization axis changing device toward the optical modulation layer, reflects a linearly polarized light component, in a third direction different from the second direction, of the light received from the side of the transmitted light polarization axis changing device toward the transmitted light polarization axis changing device, and emits a linearly polarized light component, in the second direction, of light received from the side of the optical modulation layer toward the transmitted light polarization axis changing device, and wherein a display pattern portion is formed at a position in the modulation pattern of the optical modulation layer corresponding to the control region in a plane, and an integrated icon display is produced by a combination of a plurality of display pattern portions. According to this embodiment, it is possible to selectively display a plurality of kinds of icons in the same region, to change the icon display form, and to activate the icon display.

There is provided an electronic device having a display device of the above exemplary embodiments. The electronic device includes electronic timepieces, various domestic electrical appliances having an electronic control section, and portable electronic devices, such as portable telephones and portable information terminals. In particular, the application to electronic devices with a limited display area, for example, portable electronic devices, such as portable telephones and electronic wristwatches, makes it possible to relatively easily form a control region and to obtain a superior icon display.

According to various exemplary embodiments, it is preferable that the display portion of the display pattern portion be structured to show an icon display.

According to the above exemplary embodiments, a liquid crystal panel may be used as the transmitted light polarization axis changing device. The second polarization separating element and the third polarization separating element may have a multilayered structure formed by stacking a first layer and a second layer having different refractive indices in a predetermined direction in a plane and equal refractive indices in a direction other than the predetermined direction. In this case, it is preferable that the predetermined direction and the other direction be orthogonal to with each other. Furthermore, it is preferable that the first layer and the second layer be repeatedly and alternately stacked while gradually changing the thicknesses thereof so as to operate within a predetermined wavelength range.

DETAILED DESCRIPTION OF THE EMBODIMENTS

Figure 1:
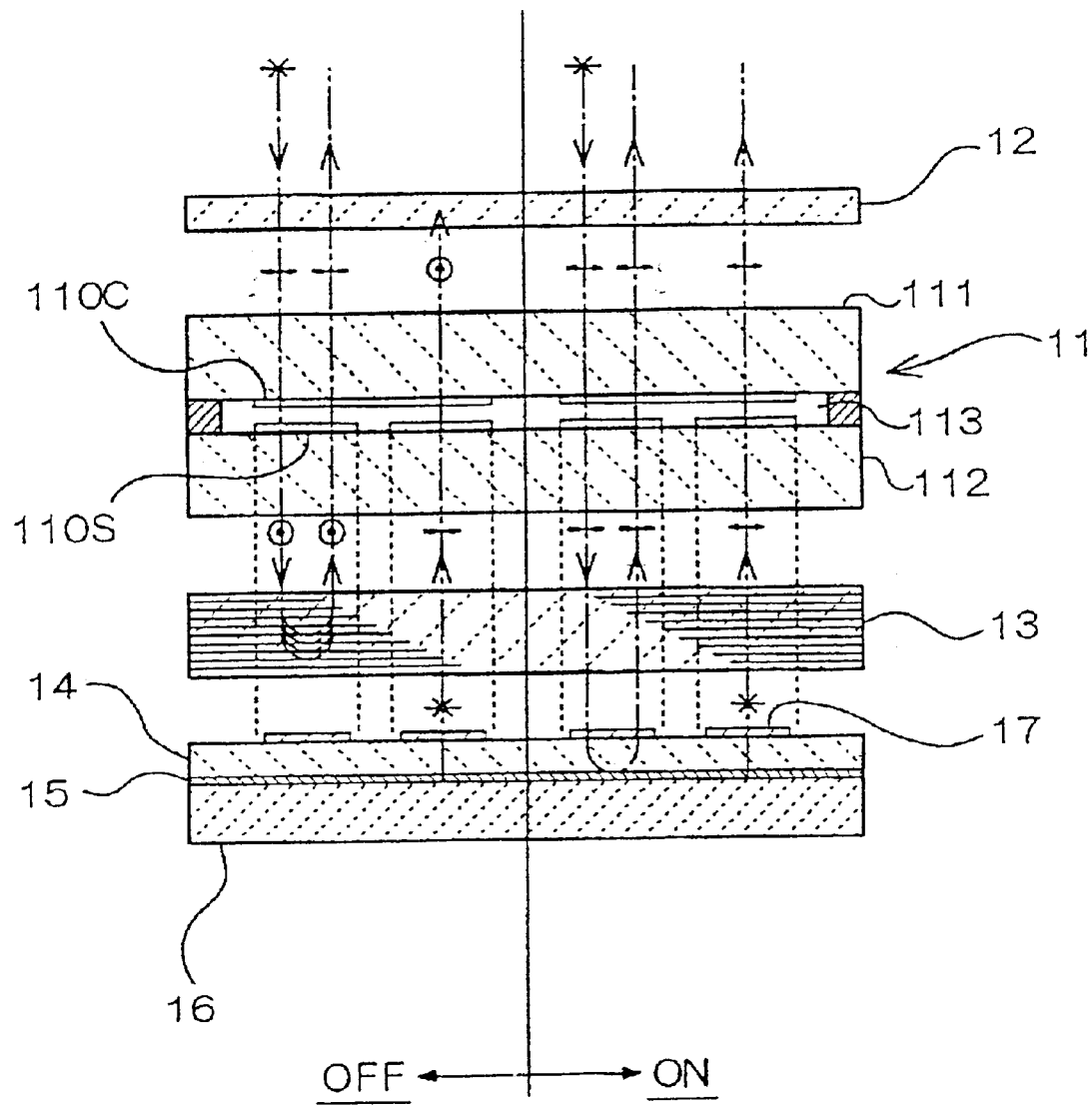
FIG. 1 is a schematic structural view showing the general configuration of a display device according to an embodiment of the present invention.

Embodiments of the present invention will now be described with reference to the attached drawings. FIG. 1 is a schematic general structural view of an embodiment of the present invention which will be described below. In this embodiment, a liquid crystal panel 11 is used as a transmitted light polarization axis changing device. The liquid crystal panel 11 has a liquid crystal layer 113 sealed between transparent panel substrates 111 and 112 made of glass or the like by a sealing member. Common electrodes 110C made of a transparent conductive material, such as ITO, are formed on the inner surface of the panel substrate 111, and segment electrodes 110S are formed on the inner surface of the panel substrate 112 at positions opposing the common electrodes 110C. The segment electrodes 110S form control regions in a display surface of the liquid crystal panel 11. The liquid crystal panel 11 is configured so as to control the state of orientation of the liquid crystal layer 113 in each control region. Basically, the liquid crystal panel adopted in this embodiment is a TN liquid crystal panel using liquid crystal having a 90-degree twisted structure. An STN liquid crystal panel, a panel using ECB liquid crystal, and the like may be used as the liquid crystal panel. The STN liquid crystal panel also includes an F-STN (Film Compensated Super-Twisted Nematic) liquid crystal panel using a color-compensating optical anisotropic substance.

A polarizer 12 serving as a first polarization separating element, is placed on the front side of the liquid crystal panel 11. This polarizer 12 is similar to that used in a general type of TN liquid crystal display panel, and serves to transmit a linearly polarized light component polarized in a predetermined direction of radiated light and to absorb a linearly polarized light component polarized in a direction orthogonal to the predetermined direction. Actually, a multilayered film may be used in which a polarizing layer is sandwiched between protective layers of TAC (triacetyl cellulose).

A polarizing film 13 serving as a second polarization separating element is placed on the back side of the liquid crystal panel 11. The polarizing film 13 serves to transmit a linearly polarized light component polarized in a predetermined direction of radiated light, and to reflect a linearly polarized light component polarized in a direction orthogonal to the predetermined direction.

Figure 2:
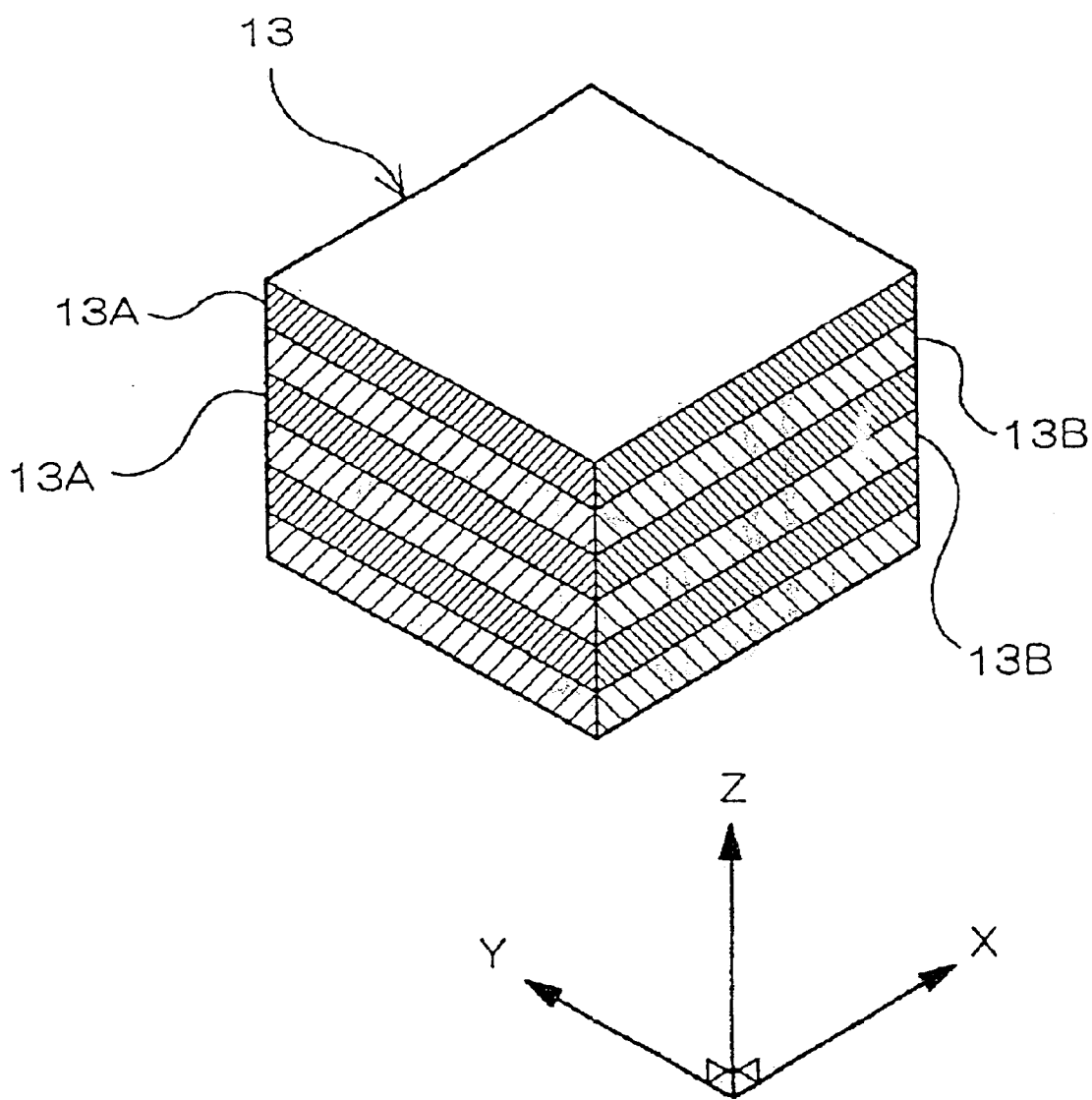
FIG. 2 is a structural view schematically showing the structure of a polarizing film used in the embodiment.

The polarizing film 13 has a multilayered structure shown, for example, in FIG. 2. In this structure, thin films 13A and thin films 13B made of two kinds of synthetic resins are alternately stacked. The refractive index $n_{AX}$ of the thin films 13A in the X-axis direction in the figure is different from the refractive index $n_{AY}$ thereof in the Y-axis direction, and the refractive index $n_{BX}$ of the thin films 13B in the X-axis direction in the figure is equal to the refractive index $n_{bY}$ thereof in the Y-axis direction. The refractive index $n_{AY}$ of the thin films 13A in the Y-axis direction is equal to the refractive index $n_{BY}$ in the Y-axis direction. Therefore, of the light entering the multi-layered structure in the Z-axis direction, linearly polarized light component polarized in the Y-axis direction is transmitted in a manner similar to an optically homogeneous material, and emerges unchanged.

On the other hand, assuming that the thickness in the Z-axis direction of the thin films 13A is $t_A$, the thickness in the Z-axis direction of the thin films 13B is $t_B$, and the wavelength of incident light is $\lambda$, $$t_A \times n_{AX} + t_B \times n_{BX} = \lambda/2 \qquad \text{[Formula 1]}$$

By making this equation hold true, a linearly polarized light component polarized in the X-axis direction, of the light which has the wavelength $\lambda$ and enters in the Z-axis direction, is reflected as an X-axis direction linearly polarized light component.

By stacking the thin films 13A and the thin films 13B while varying the thickness $t_A$ of the thin films 13A, in the Z-axis direction and the thickness $t_B$ of the thin films 13B in the Z-axis direction, it is possible to establish the relationship expressed by the above Equation 1 in a plurality of wavelength regions, and to reflect the above-described X-axis direction linearly polarized light component. In particular, by continuously varying the above thicknesses, the above operation can be exerted on light with wavelengths within a predetermined range. In this embodiment, the polarizing film 13 serving as the polarization separating element is configured by stacking the multiple thin films 13A and 13B having variable thicknesses so as to reflect a linearly polarized light component polarized in the X-axis direction as an X-axis direction linearly polarized light component and to transmit a linearly polarized light component polarized in the Y-axis direction as a Y-axis direction linearly polarized light component, over almost the entire wavelength range of visible light. Such a polarization separating element is disclosed in international publication (WO95/17692).

Examples of a polarization separating element having functions similar to those of the polarizing film 13 are a polarizing film having quarter-wave plates placed on one or both sides of a cholesteric liquid crystal layer, a polarizing film configured so as to separate polarized light into reflected polarized light and transmitted polarized light by using Brewster's angle (disclosed in SID 92 DIGEST, pp. 427 to 429), and a polarizing film using a hologram.

A transmissive film 14, such as a polyester film, made of synthetic resin or the like is placed behind the polarizing film 13. Behind the transmissive film 14, a reflecting layer 15 is formed of a metal thin film or the like as a light reflecting layer. Preferably, the reflecting layer 15 is deposited on the back surface of the transmissive film 14 by evaporating metal, such as aluminum, thereon. By roughening the surface of the reflecting layer 15 or forming a diffusing layer on the front side of the reflecting layer 15, light can be irregularly reflected. Such a structure improves visibility. For example, when the manner of irregular reflection is substantially uniform over the entire wavelength range, the reflecting layer 15 has a white appearance. Preferably, the reflecting layer 15 is structured to have an outward appearance similar to that of the polarizing film 13 in a reflection state, as will be described later.

Behind the reflecting layer 15, a backlight 16 is placed as a surface-emitting light source which is formed of an electroluminescence (EL) device or a combination of a known light source and a light guide plate. The backlight 16 serves to perform transmitted illumination from behind the reflecting layer 15, and to allow the display to be visible when external light is not available, for example, at night. In this case, the reflecting layer 15 must be structured to transmit light from the backlight 16, and preferably, is constructed by, for example, a half mirror formed of a thin metal film or the like. That is, the reflecting layer 15 in this case reflects external light incident from the front side toward the front side in a light environment, and emits light from the back mirror 16 toward the front side in a dark environment.

On the front surface of the transmissive film 14, an optical modulation layer 17 is formed by printing or by other methods. The optical modulation layer 17 is formed of a transmissive color filter formed in a predetermined color, a nontransparent layer, or the like, and is provided as an illustration, a character, a sign, a numeral, a pattern, or a background formed in a predetermined design. The optical modulation layer 17 may be formed on the back surface of the transmissive film 14. The optical modulation layer 17 may be formed by partially coloring the transmissive film 14 instead of various printing methods, such as screen printing or printing by a printer. Alternatively, the optical modulation layer 17 may be formed by placing thin pieces on the surface of the transmissive film. By stacking a plurality of transmissive films with display pattern portions showing icons, a more complicated and fine icon display can be achieved.

The optical modulation layer 17 can be used in various manners. In both cases in which the optical modulation layer 17 constitutes a text information display section and an icon display section described above, it is preferable that the display pattern portion in a modulation pattern of the optical modulation layer 17 coincide, in a plane, with the control region formed by the segment electrode 110S or be included in the control region in a plane, so that the display pattern portion is completely covered by the control region.

The operation of the above-described configuration shown in FIG. 1 will now be described. In the following description, the liquid crystal panel 11 is configured so that, when a predetermined voltage is applied between the common electrode 110C and the segment electrode 110S, liquid crystal molecules in the liquid crystal layer 113 are oriented in the direction of the electric field so as to maintain the direction of the polarization axis of incident light, and, when the predetermined voltage is not applied, the liquid crystal molecules in the liquid crystal layer 113 are placed into an initial oriented state so as to rotate the polarization axis of incident light by 90°. The relationship between the rotation of the polarization axis and the presence and absence of the predetermined voltage may be set to be opposite from that in the above operation.

In a case in which external light is obtained in a light environment or the like, it is transmitted through the polarizer 12, and enters the liquid crystal panel 11 as linearly polarized light polarized in a direction serving as both a first direction and a second direction (a direction in parallel with the plane of the drawing). In a state or place in which the predetermined voltage is not applied between the common electrode 110C and the segment electrode 110S (hereinafter simply referred to as an "off state"), when the above linearly polarized light passes through the liquid crystal panel 11, it is converted into linearly polarized light polarized in a third direction (a direction orthogonal to the plane of the drawing) with the polarization axis thereof rotated by 90°. When the linearly polarized light in the third direction enters the polarizing film 13 placed behind the liquid crystal panel 11, it is reflected frontward as the linearly polarized light in the third direction, as described above. The linearly polarized light passes again through the liquid crystal panel 11 to become linearly polarized light polarized in a direction serving as both the first and second directions, and is emitted frontward via the polarizer 12.

In contrast, in a state or place in which the predetermined voltage is applied between the common electrode 110C and the segment electrode 110S in the liquid crystal panel 11 (hereinafter simply referred to as an "on state"), even when linearly polarized light, which has passed through the polarizer 12 and which is polarized in a direction serving as the first and second directions, passes through the liquid crystal panel 11, it maintains the direction of polarization. For this reason, the linearly polarized light is transmitted through the polarizing film 13 and the transmissive film 14 placed in the rear thereof, and is reflected by the reflecting layer 15. In this case, light applied to a display pattern portion of the optical modulation layer 17 is modulated in a predetermined pattern or color and is reflected by the optical modulation layer 17. Alternatively, the light is partly absorbed and colored by the optical modulation layer 17 while passing therethrough, is reflected by the reflecting layer 15, and passes through the optical modulation layer 17 again. After the reflected light passes through the polarizing film 13 and the liquid crystal panel 11 again, it is emitted from the polarizer 12.

While a part of the light scattered by the optical modulation layer 17 and the reflecting layer 15 changes the polarization state thereof, such light with the polarization state changed is not transmitted through the polarizing film 13, but is reflected thereby. The light is then modulated and reflected by the optical modulation layer 17 and the reflecting layer 15 so as to become a linearly polarized light component polarized in a direction serving as the first and second directions, is transmitted through the polarizing film 13, the liquid crystal panel 11, and the polarizer 12, and is emitted frontward.

Therefore, when external light is obtained in a light environment or the like, the display pattern portion of the optical modulation layer 17, which overlaps with the control region in the on state, is visible, and the display pattern portion of the optical modulation layer 17, which overlaps with the control region in the off state, is not visible, that is, only light reflected from the polarizing film 13 is visible. Accordingly, the display pattern portion of the optical modulation layer 17 can be displayed or not be displayed by controlling the on and off states of the liquid crystal panel 11. In this case, since light reflected from the polarizing film 13 is visible even in a region where the display pattern portion is not displayed, it is possible to make the entire display section bright.

In a case in which external light is not available in a dark environment or the like, the backlight 16 is lighted, a part of the light emitted from the backlight 16 is transmitted through the reflecting layer 15 and the transmissive film 14, and enters the polarizing film 13. The polarizing film 13 transmits only a linearly polarized light component of the light from the backlight 16 polarized in a direction serving as the first direction and the second direction. The linearly polarized light component enters the liquid crystal panel 11. In the off state of the liquid crystal panel 11, when the linearly polarized light component passes through the liquid crystal panel 11, it rotates the direction of the polarization axis thereof by 90° so as to become linearly polarized light polarized in a third direction. Since the linearly polarized light is blocked by the polarizer 12, it is not emitted frontward. In contrast, in the on state of the liquid crystal panel, even when the linearly polarized light component passes through the liquid crystal panel 11, it maintains the direction of the polarization axis thereof. Therefore, the linearly polarized light component passes through the polarizer 12 unchanged and is emitted frontward.

Accordingly, when external light is not available in a dark environment or the like, light is emitted from only control regions in the on state by lighting the backlight 16, and light is not emitted from control regions in the off state. That is, display pattern portions of the optical modulation layer 17 overlapping with control regions in the on state are displayed, and control regions in the off state serve as a dark background.

Figure 3:
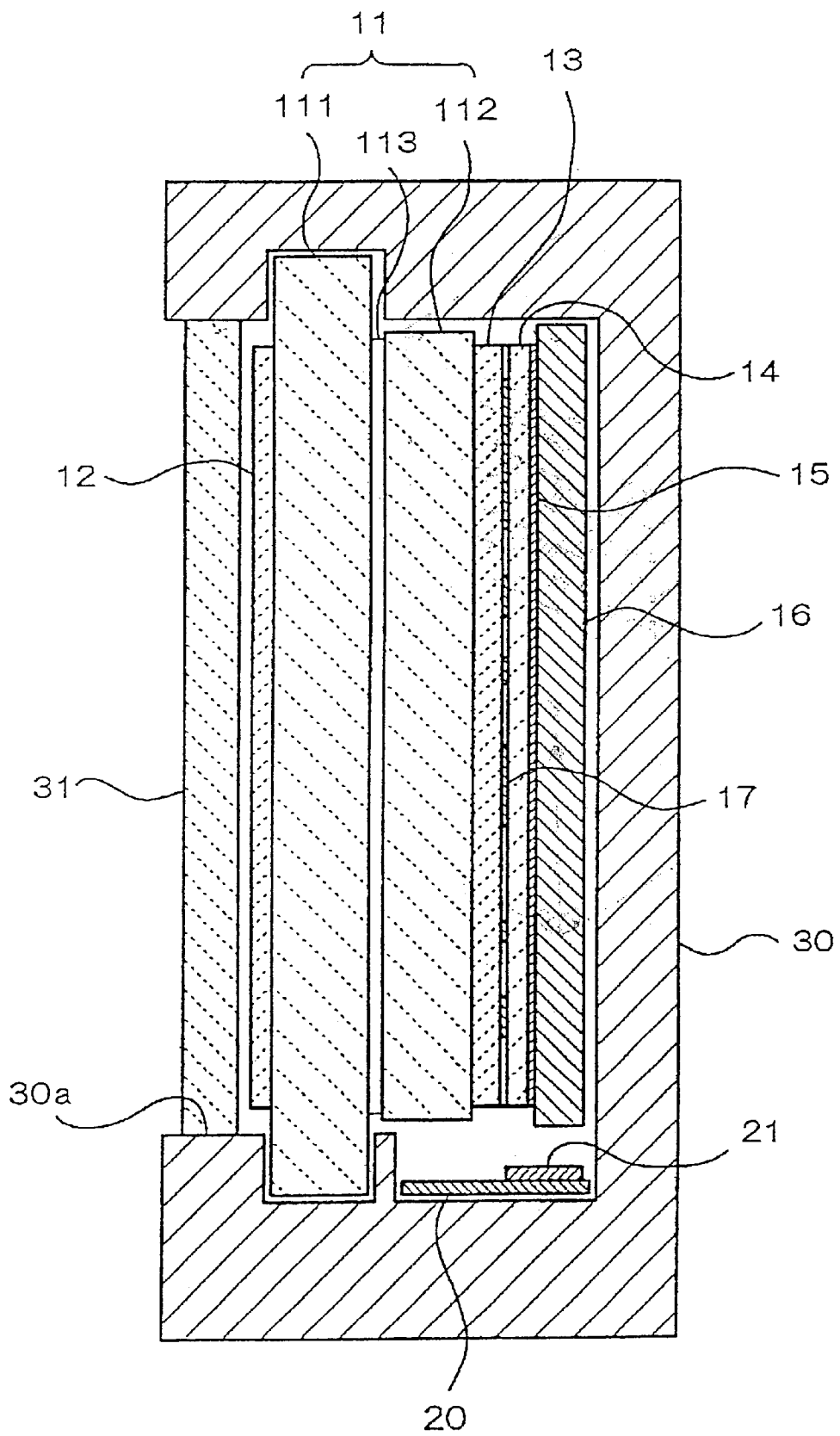
FIG. 3 is a schematic structural sectional view schematically showing the configuration of the embodiment applied to a bracket clock having a weather forecasting function.

FIG. 3 is a structural sectional view showing an example of a more specific configuration of this embodiment. In this example, this embodiment is applied to an electronic bracket clock having a weather-forecasting function. A configuration similar to the above is provided inside a case member 30. A transparent plate 31 made of glass or the like is mounted at an opening portion 30a formed on the left side of the case member 30 in the figure, and a display surface is formed inside the transparent plate 31. Inside the case member 30, a polarizer 12, a liquid crystal panel 11, a polarizing film 13, an optical modulation layer 17, a transmissive film 14, a reflecting layer 15, and a backlight 16, which are similar to those in the above description, are placed in a layered manner.

The liquid crystal panel 11 is fixed in a state in which a panel substrate 111 is fitted and positioned in a mounting frame structure formed inside the case member 30. The optical modulation layer 17 is formed on the front surface of the transmissive film 14 formed of a polyester film or the like by printing or by other methods, and the reflecting layer 15 is deposited on the back surface of the transmissive film 14 by evaporation or by other methods. The reflecting layer 15 may be deposited not on the transmissive film 14, but on the front side of the backlight 16. The polarizer 12 and the polarizing film 13 are bonded onto the outer surfaces of the panel substrates 111 and 112 of the liquid crystal panel 11.

A circuit substrate 20 forming a control means is placed inside the case member 30. Control circuit sections (IC chips), which form, for example, a CPU (central processing unit) and an MPU (microprocessor unit), are mounted on the circuit substrate 20.

Figure 4:
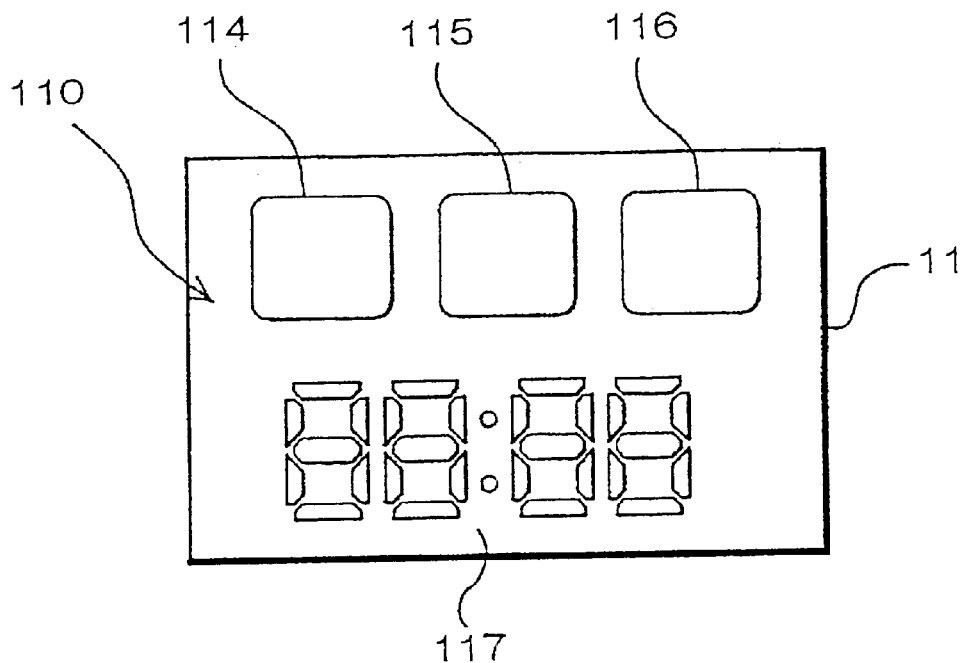
FIG. 4 is an explanatory view showing a planar pattern on control regions constituted by segment electrodes of a liquid crystal panel in the above embodiment.

FIG. 4 shows an example of the configuration of the planar pattern of control regions constituted by segment electrodes 110S in the liquid crystal panel 11 in the above specific configuration example. In this example, control regions 114, 115, and 116 and a group of control regions 117 are formed by the planes of segment electrodes 110S on the display surface. The control regions 114, 115, and 116 are each formed so as to cover a predetermined region, and the control regions 117 include a plurality of control region portions of a known seven-segment form. In this example, the control regions 114, 115, and 116 constitute icon display sections, and the group of control regions 117 constitute text information display sections.

Figure 5:
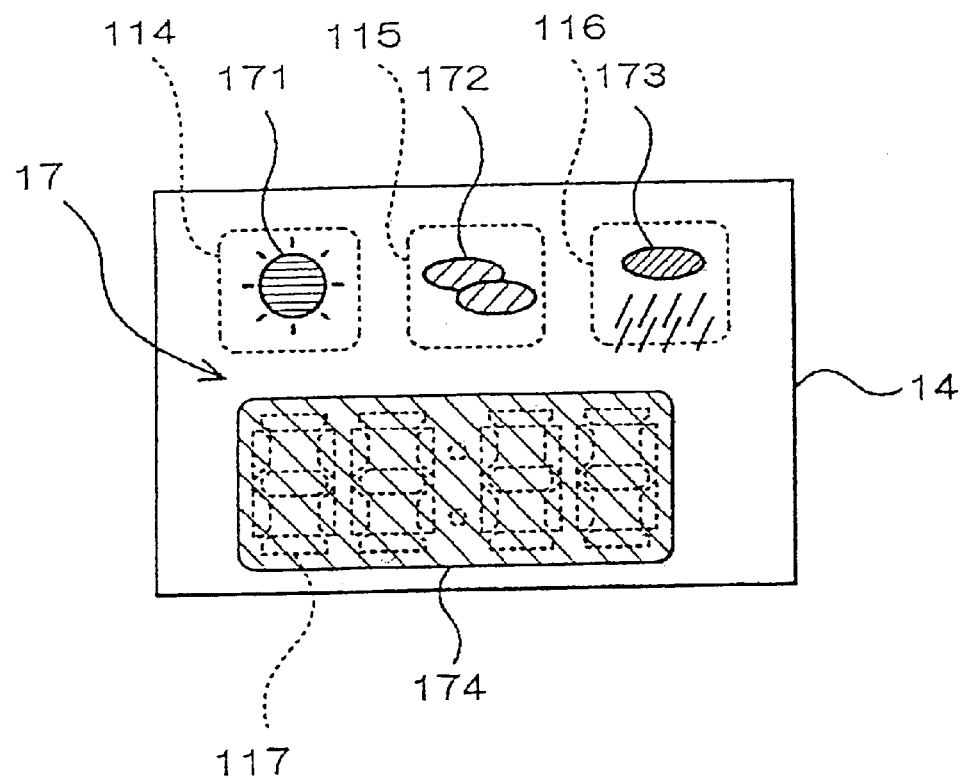
FIG. 5 is an explanatory view showing a modulation pattern of an optical modulation layer in the above embodiment.

FIG. 5 shows a modulation pattern of the optical modulation layer 17 on the transmissive film 14 corresponding to the liquid crystal panel 11 shown in FIG. 4. The modulation pattern of the optical modulation layer 17 includes four display pattern portions 171, 172, and 173 and a background pattern portion 174. The display pattern portions 171, 172, and 173 constitute icon display sections corresponding to the above-described control regions 114, 115, and 116, and the background pattern portion 174 constitutes a text information display section corresponding to the above-described control region 117.

In the examples shown in FIGS. 4 and 5, by applying and not applying a predetermined voltage between a common electrode 110C and a segment electrode 110S in the liquid crystal panel 11, the on and off states of a control region in the planar form similar to that of the segment electrode 110S can be controlled. Therefore, it is possible to display a predetermined icon (e.g., the display pattern portion 171) in a desired icon display section (e.g., the control region 114 in the figure) of the three icon display sections on a display surface 10 shown in FIG. 6, according to the control state of the liquid crystal panel 11.

In this case, the display pattern portion 171 and the reflecting layer 15 are visible inside the control region 114 shown in the figure, and the reflecting surface of the polarizing film 13 is visible at the periphery of the control region 114. Therefore, in order to display the icon of the shown display pattern portion 171 so as to be isolated from the homogeneous background, it is preferable that the reflecting surface of the polarizing film 13 and the reflecting surface of the reflecting layer 15 be similar in outward appearance to such an extent that they cannot be easily distinguished.

Figure 6:
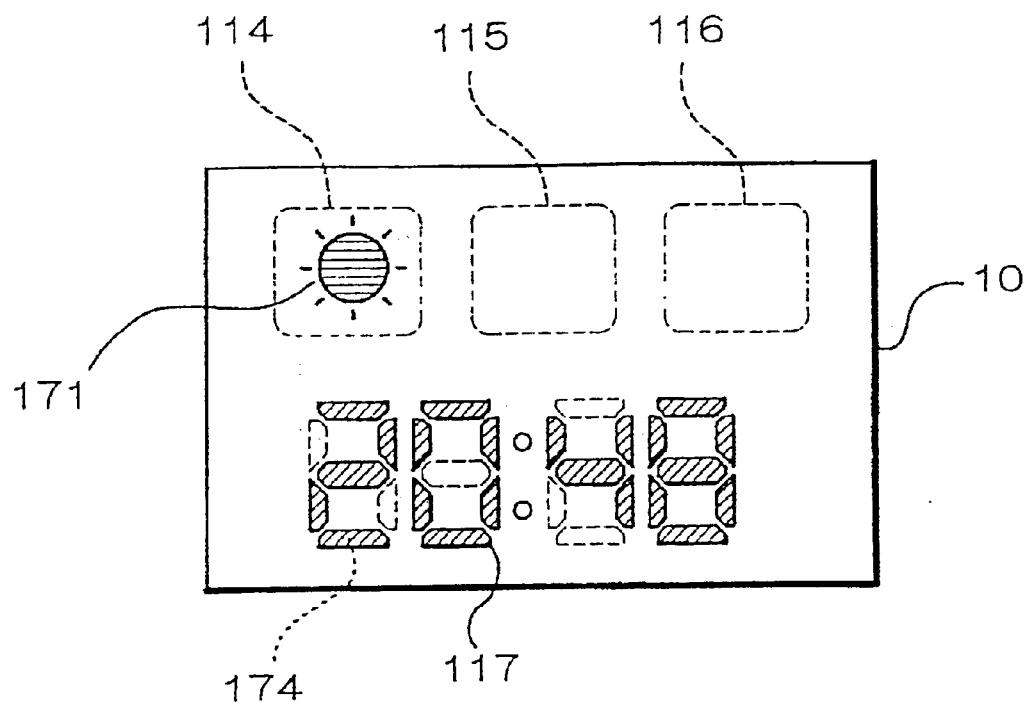
FIG. 6 is an explanatory view showing a display form of a display surface in the above embodiment.

In contrast, in the text information display section, it is possible to select the on or off state of a plurality of control region portions of the group of control regions 117, and to display predetermined information according to the selection, as shown in FIG. 6. In this example, the hour and minute are displayed in the text information display section. In this case, since the background pattern portion 174 is disposed behind segment electrodes in on-state control regions, the color, pattern, or the like of the background pattern portion 174 is visible as the color, pattern, or the like of displayed text information. The background pattern portion need not have a uniform color, and may be provided, for example, with various patterns or gradations.

In the above example, while the display pattern portion 173 shown in FIG. 5 extends outside the control region 116 constituted by segment electrodes, only a part of the display pattern portion 173 (corresponding to the above-described "display portion"), which is formed inside the control region 116, is actually visible. Therefore, as long as the above icon (display portion) includes sufficient display contents, the display portion is entirely covered by the control region, which makes it possible to sufficiently present the advantages of the present invention, which will be described later. Preferably, the display pattern portion corresponding to the icon display is not provided with an extending portion, as is different from the display pattern portion 173, and is entirely covered by a corresponding control region.

In this embodiment, as described above, in order to produce icon display, predetermined illustrations or the like are formed in the display pattern portions 171, 172, and 173 of the optical modulation layer 17, and the control regions 114, 115, and 116 overlapping with the display pattern portions in a plane are formed in the liquid crystal panel 11. In particular, the control regions 114, 115, and 116 are formed to be somewhat larger than the icon display and to include the icon display with some extra space so as to completely include the icon display, that is, so as to completely cover the icon display. This makes it possible to produce icon display without any trouble, even when some pattern displacement in a planar direction is caused between the display pattern portions 171, 172, and 173 formed on the transmissive film 14 and the control regions 114, 115, and 116 of the liquid crystal panel 11.

While one icon display is constituted by one display pattern portion in the above example, one icon display may be constituted by a plurality of display pattern portions. In this case, the form of the icon display can be changed according to the combination of a plurality of display patterns.

In this embodiment, only the optical modulation layer 17 need be replaced to produce another icon display since it is separate from the liquid crystal panel 11. In this case, when the control region is large sufficient to completely cover the icon display, it is possible to produce display without any trouble even when the shape or size of the icon display is changed to some extent due to the replacement.

Figure 7:
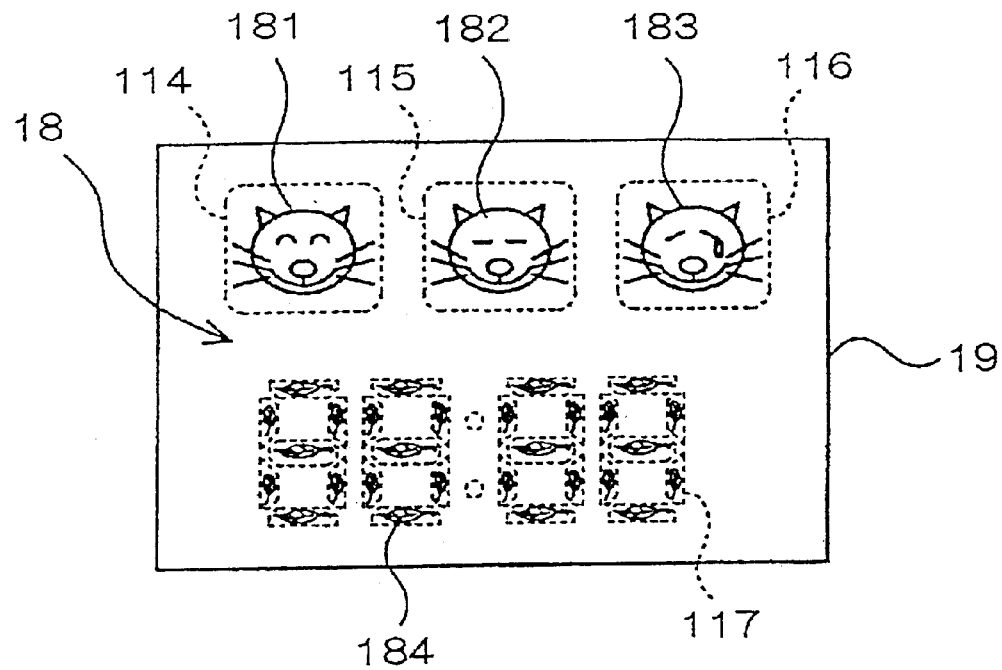
FIG. 7 is an explanatory view showing a state in which a transmissive film in the above embodiment is replaced with another transmissive film with a different modulation pattern.

FIG. 7 shows a transmissive film 19 having an optical modulation layer 18 which can be substituted for the transmissive film 14 having the optical modulation layer 17 in the above example. The transmissive film 19 is provided with the optical modulation layer 18 including display pattern portions 181, 182, and 183 and a group of display patterns 184 different from those of the optical modulation layer 17. While the display pattern portions 181, 182, and 183 are different in shape, color, pattern, and size from the above display pattern portions 171, 172, and 173, they are held inside control regions 114, 115, and 116 of a liquid crystal panel 11. The display pattern portions 181, 182, and 183 are appropriately selected and displayed according to the control state of the control regions in a manner similar to the above.

On the other hand, the group of display patterns 184 have a plurality of unit patterns formed to be held inside each control region portion of a group of control regions 117 of the liquid crystal panel 11. The display unit patterns are independent from one another in a manner similar to the above display pattern portions 181, 182, and 183. In the illustrated example, the display patterns 184 have a display unit pattern in which an illustration in the form of a leaf is made, or a display unit pattern in which a leaf itself is shown. Preferably, the display unit pattern is formed to be held inside a corresponding (overlapping in a plane) control region with some extra space, in a manner similar to that of the above display pattern portion.

In this way, the characteristics of the present invention are not limited to the icon display. When a pattern is formed in a text information display section so as to be completely covered by a control region, as in the display unit patterns of the above display patterns 184, it is possible to appropriately change the design and impression of the text information display. In this case, as long as the display unit pattern is held inside each control region of the control regions 117, the shape thereof can be appropriately changed, and different designs can be easily achieved.

In this embodiment, since the pattern of the optical modulation layer can be appropriately changed without changing the structure of the liquid crystal panel 11, as shown in FIG. 7, for example, a display device having a plurality of kinds of display modes can be easily produced with the same design, and this increases the variety of products. This is substantially effective, for example, in producing a plurality of types of products using different characters, and in simultaneously forming a plurality of grades with icon displays different in number and type.

Figure 8:
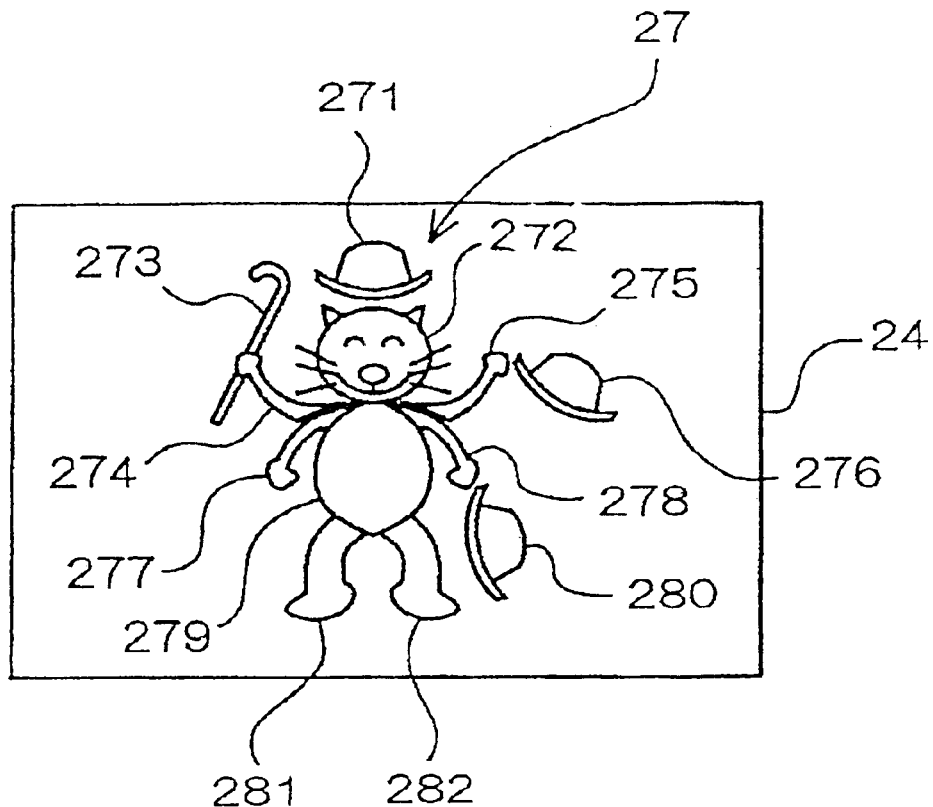
FIG. 8 is an explanatory view showing a modulation pattern of a transmissive film having an optical modulation layer for permitting animation display in the above embodiment.

Another example of the configuration of this embodiment will now be described with reference to FIGS. 8 and 9. While the configuration of this example is basically similar to that of the above embodiment, a transmissive film 24 shown in FIG. 8 is used instead of the transmissive film 14. An optical modulation layer 27, in which a plurality of display pattern portions 271 to 282 are arranged in a predetermined pattern, is formed on the surface of the transmissive film 24, as shown in the figure. The optical modulation layer 27 can be formed by various methods, such as printing, coloring, or placing, in a manner similar to the above embodiment.

The optical modulation layer 27 is different from the optical modulation layer 17 of the above embodiment in that an integrated icon display is formed of a combination of display portions of a plurality of display patterns. The optical modulation layer 27 is also characterized in having a combination of a plurality of display pattern portions which are only selectively displayed. For example, while the display pattern portions 272, 279, 281, and 282 are set to be always displayed in synchronization, the display pattern portion 273 is selectively switched between a display state and a non-display state. Furthermore, the display pattern portions 271, 276, and 280 are set so that one of them is usually selected. Similarly, the display pattern portions 274 and 277, or 275 and 278 are set so that either of them is selectively displayed. Control regions corresponding to the above display pattern portions are formed in a liquid crystal panel 20 (not shown). Separate segment electrodes must be provided for the display pattern portions, which are selectively displayed, so that they correspond to separate control regions. In contrast, the display pattern portions to be always displayed in a synchronized manner may be placed inside a common control region.

Figure 9:
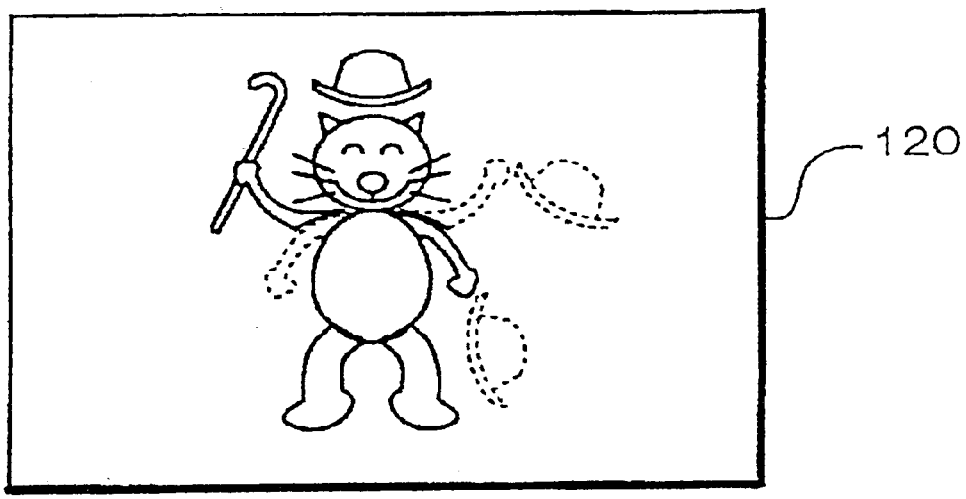
FIG. 9 is an explanatory view showing a display form of a display surface using the transmissive film shown in FIG. 8.

The above configuration permits a display shown on a display surface 120 shown in FIG. 9. In this case, motion can be added to a figure by switching among the display pattern portions to be selectively displayed. For example, by alternately displaying the display pattern portions 274 and 277, the figure is caused to look as if it is swinging its arm up and down. Similarly, it is possible to cause the figure to look as if it takes a hat 272 on and off, moves a hat 276, 280 up and down, and shows or conceals a stick 273.

In this structural example, it is also preferable that patterns of segment electrodes for defining control regions corresponding to the display pattern portions be made somewhat larger than the display pattern portions so as to cover the display pattern portions. This prevents display failure resulting from pattern displacement between the liquid crystal panel and the transmissive film in a planar direction.

However, in a case in which a plurality of display pattern portions are close to one another at multiple positions in the optical modulation layer 27 of the example shown in FIGS. 8 and 9, it is sometimes difficult to form corresponding control regions in the above-described manner. That is, at a position where the outer edges of the display pattern portions are close to each other, corresponding control regions must also be close to each other. This causes problems, for example, short-circuiting between segment electrodes, a change in potential due to electrostatic capacitance, and difficult wiring.

Figure 10:
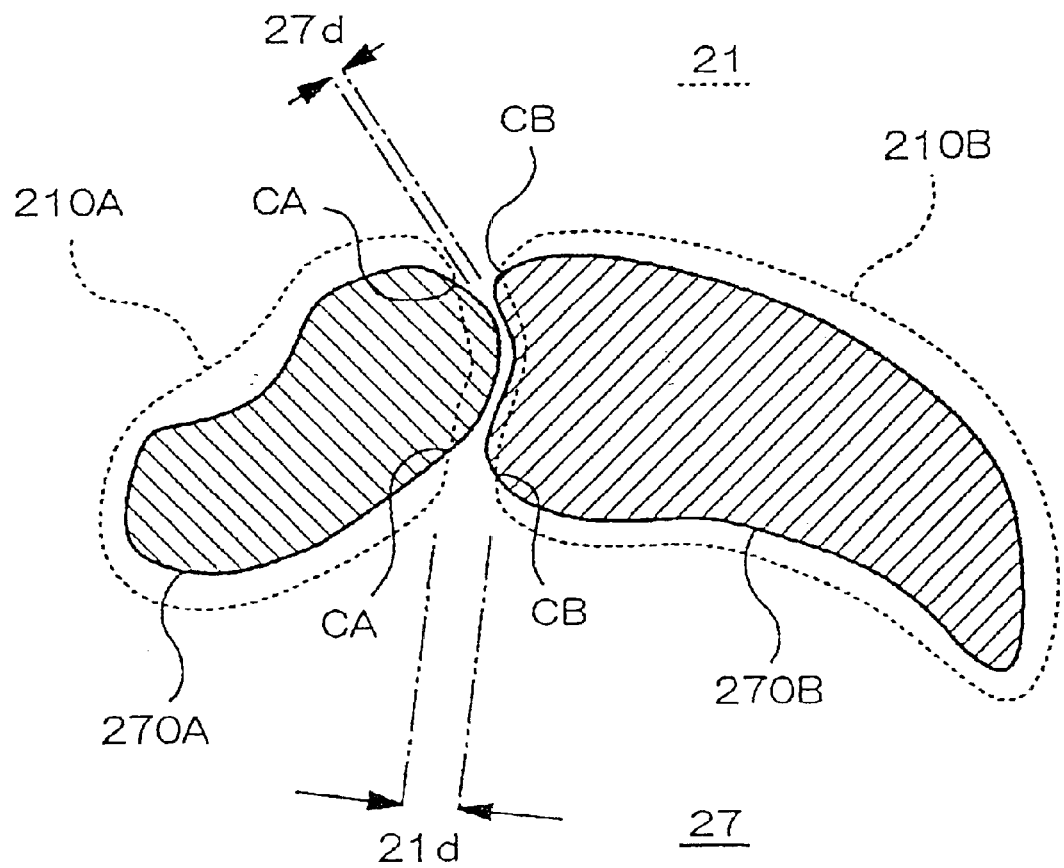
FIG. 10 is an explanatory view of a planar pattern showing the relationship between display pattern portions and control regions in the example shown in FIGS. 8 and 9.
Figure 11:
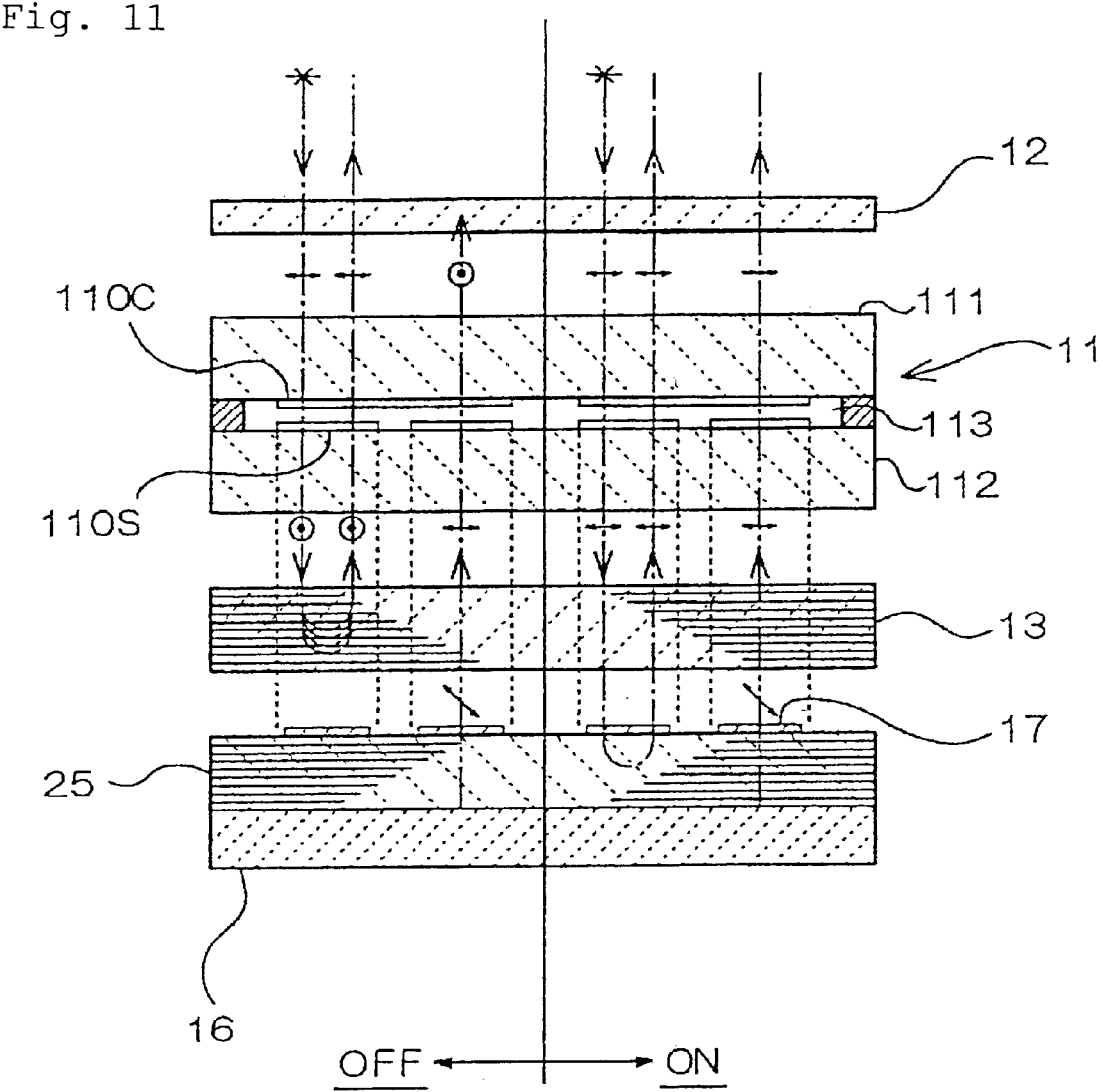
FIG. 11 is a schematic structural view showing the general configuration of another embodiment.

Accordingly, in this embodiment, where adjoining display pattern portions are not particularly close to each other, as in most of the outer edges of display patterns 270A and 270B, as shown in FIG. 10, control regions 210A and 210B are formed so as to basically have shapes that coincide with those of the display pattern portions 270A and 270B, as described above, or so as to extend outside the display pattern portions 270A and 270B. In contrast, where the adjoining display pattern portions 270A and 270B are significantly close to each other, conversely, the outer edges of the control regions 210A and 210B3 are recessed so as to retreat from each other. That is, a clearance 21d between the adjoining control regions 210A and 21013 corresponding to the adjoining display pattern portions 270A and 270B is set to be larger than a clearance 27d between the display pattern portions 270A and 270B.

This makes it possible to insulate the control regions even at a portion where the outer edges of the display pattern portions are close to each other, to limit interaction between electric fields, to ensure a wiring region, and to thereby prevent display failure and difficult design. In the remaining outer edge portions, the outer edges of the control regions 210A and 210B are formed outside the outer edges of the display pattern portions 270A and 270B, as shown in the figure. Therefore, the outlines of the display pattern portions 270A and 270B and the outlines of the control regions 210A and 210B are considerably close to each other only at two intersections CA and CB. As a result, even when pattern displacement in a planar direction is caused between the transmissive film 27 and the liquid crystal panel 21, the display form to be viewed hardly changes.

While a space must be formed between control regions in a general type of liquid crystal panel, a space need not always be formed between display pattern portions. Therefore, the display pattern portions 270A and 270B shown in FIG. 10 may be formed in close contact with each other.

Finally, a description will be given of another embodiment that is particularly effective in carrying out the above example configurations. This embodiment is substantially similar to the above embodiment. Similar components are denoted by the same numerals, and a description thereof is omitted.

In this embodiment, a polarizing film 25 having the same structure as that of a polarizing film 13 is disposed instead of the above-described reflecting layer 15. Since it is optically pointless to place the polarizing film 25 in the same position as that of the polarizing film 13, the polarizing film 25 is placed so that the azimuth angle thereof on the optical axis is rotated by any angle except 180° relative to the polarizing film 13. In particular, when display is viewed by reflecting incident external light, it is preferable that the azimuth angle of the polarizing film 25 is rotated by approximately 90° relative to the polarizing film 13. When display is viewed by emitting light from a backlight 16 frontward, the azimuth angle of the polarizing film 25 must be set to be rotated by any angle except 90° relative to the polarizing film 13, as will be described later.

According to this embodiment, when a liquid crystal panel 11 is in the off state, in a manner similar to that in the above embodiment, a linearly polarized light component of external light, which has passed through a polarizer 12 and is polarized in parallel with the plane of the drawing, is caused by the liquid crystal panel 11 to change the polarization axis by 90°, is reflected by the polarizing film 13, is passed again through the liquid crystal panel 111 and the polarizer 12, and is finally emitted outside. In contrast, when the liquid crystal panel 11 is in the on state, a linearly polarized light component of external light, which has passed through the polarizer 12 and is polarized in parallel with the plane of the drawing, passes through the liquid crystal panel 11 unchanged, enters and passes through the polarizing film 13, and reaches the polarizing film 25. At least a part of the linearly polarized light component, which has reached the polarizing film 25, is reflected, passes again through the polarizing film 13, the liquid crystal panel 11, and the polarizer 12, and is emitted outside. In this case, when the azimuth angle of the polarizing film 25 is set to be rotated by 90° relative to the polarizing film 13, the polarizing film 25 is equivalent to a reflecting layer for reflecting almost all of the linearly polarized light component passing through the polarizing film 13. Therefore, in this embodiment, various displays, colors, and the like can be shown on the display surface by an optical modulation layer 17 placed on the front side of the polarizing film 25.

In this embodiment, when the azimuth angle of the polarizing film 25 is set to be rotated by any angle except 180° relative to the polarizing film 13, the polarizing film 25 functions as a reflecting layer. In this case, a display by light reflected from the polarizing film 13 in a portion of the liquid crystal panel 111 in the off state and a display by light reflected from the liquid crystal panel 25 in a portion of the liquid crystal panel in the on state are similar in outward appearance (for example, a silver mirror color or white when a diffusing layer is placed in front of the polarizing film 13). Even when the control regions are larger than the icon displays, as described above, there is no pronounced difference between the control region in the on state and the control region in the off state, which can provide a good display. In particular, in order to reduce the difference in brightness between the on-state portion and the off-state portion, it is preferable to adjust the azimuth angles of the polarizing film 13 and the polarizing film 25.

In this embodiment, in order to allow display to be viewed by light from the backlight 16, the azimuth angle of the polarizing film 25 and the azimuth angle of the polarizing film 13 must be set so that they are not completely orthogonal to each other. This is because light from the backlight 16 is completely blocked by the polarizing films 13 and 25 when the azimuth angles are orthogonal to each other. When the polarizing films 13 and 25 are placed so that the azimuth difference therebetween is slightly (for example, approximately 10°) offset from 90°, the above-described viewing using reflected light is not deteriorated, and the display is visible when the backlight 16 is used.

The azimuth difference between the polarizing films 13 and 25 may be automatically or manually switched when the backlight 16 is used and is not used. For example, the azimuth difference between the polarizing films 13 and 25 is set at 90° when the backlight is not used, and is set at 0° when the backlight is used. This makes it possible to obtain the highest visibility in a light environment and to obtain the brightest display in a dark environment. When the azimuth difference between the polarizing films 13 and 25 is 0°, the display can be viewed in a state similar to that in the above embodiment in which the polarizing film 25 is replaced with the transmissive film 14.

While the configurations of the display device described in the above embodiments allow the display to be viewed in a light environment and a dark environment, the present invention is not limited to the above configurations and is also applicable to a display device which does not have a backlight and allows the display to be viewed only in a light environment.

While text information is displayed in a segment form in the text information display section formed on the display surface in the above description of the embodiments, display may be produced in a dot-matrix manner in the text information display section.

Industrial Applicability

As described above, according to the present invention, external light is reflected and emitted outside by the second polarization separating element, or is reflected and emitted outside by the light reflecting layer after being modulated by the optical modulation layer, according to the control state of the control region in the transmitted light polarization axis changing device. Therefore, it is possible to switch display in each control region based on the selection of the optical path. Since the regions necessary as display portions of the display pattern portions formed in the modulation pattern of the optical modulation layer are completely covered by the control regions, even when the pattern, shape, color, and the like of the display pattern portions are fine or complicated, the shape of the control regions themselves need not be fine and complicated. This eliminates the necessity of complicating the structure for forming the control regions. As a result, the display pattern portions can be formed in an arbitrary pattern, color, or shape, and it is possible to easily produce a display that is easy to view and recognize. Furthermore, the display pattern portion can be easily changed to form a different display configuration by replacing only the optical modulation layer without changing the control region.

What is claimed is:

1. A display device, comprising:
a transmitted light polarization axis changing device that changes a polarization axis of transmitted light in a control region;
a first polarization separating element having a first side facing said transmittal light polarization axis changing device and a second side opposite the first side;
a second polarization separating element having a first side facing said transmitted light polarization axis changing device and a second side opposite to the first side;
an optical modulation layer which is not a liquid crystal cell, formed in a predetermined modulation pattern having a first side opposite from the second side of said second polarization separating element; and
a light reflecting layer placed on a second side of said optical modulation layer opposite from said first side of said optical modulation layer,
said first polarization separating element emitting a linearly polarized light component, polarized in a first direction, of light entering the second side of the first polarization separating element toward said transmitted light polarization axis changing device, and emitting a linearly polarized light component, polarized in the first direction, of light entering the first side of said first polarization separating element from said transmitted light polarization axis changing device,
said second polarization separating element transmitting a linearly polarized light component, polarized in a second direction, of light entering said first side of said second polarization separating element from said transmitted light polarization axis changing device toward said optical modulation layer, reflecting a linearly polarized light component, polarized in a third direction different from the second direction, of the light received from said transmitted light polarization axis changing device toward said transmitted light polarization axis changing device, and emitting a linearly polarized light component, polarized in the second direction, of light entering the second side of said second polarization separating element from the first side of said optical modulation layer toward said transmitted light polarization axis changing device, and
a display pattern portion being formed at a position in a modulation pattern of said optical modulation layer corresponding to said control region in a plane, and said control region completely covering a region of said display pattern portion necessary as a display portion.

2. The display device according to claim 1, a peripheral edge of said control region extending outside a peripheral edge of said display pattern portion in a plane in a direction to widen said control region.

3. The display device according to claim 1, a portion of the peripheral edge of said control region close to another control region retreating in a plane from the peripheral edge of said display pattern portion in a direction to narrow said control region, and portions of the peripheral edge of said control region other than said close portion extending in a plane outside the peripheral edge of said display pattern portion in a direction to widen said control region.

4. The display device according to claim 1, a display form produced by emission of the linearly polarized light component in the third direction reflected by said second polarization separating element and a display form produced by emission of a linearly polarized light component in the second direction, which is not modulated by said optical modulation layer, but is reflected by said light reflecting layer, being substantially the same.

5. The display device according to claim 1, said light reflecting layer being formed of third polarization separating element having a same structure as that of said second polarization separating element so as to reflect a linearly polarized light component in the second direction of light, received from the second side of said second polarization separating element, toward said second polarization separating element.

6. The display device according to claim 1, further comprising a light source placed on a side of said light reflecting layer opposite from said optical modulation layer and said light reflecting layer transmitting at least a part of light received from said light source.

7. The display device according to claim 1, a plurality of display pattern portions producing an animation display by combining said display portions thereof.

8. A display device, comprising:
- a transmitted light polarization axis changing device that changes a polarization axis of transmitted light in a control region;
- a first polarization separating element having a first side facing said transmitted light polarization axis changing device and a second side opposite to the first side;
- a second polarization separation element having a first side facing said transmitted light polarization axis changing device and a second side opposite to the first side;
- an optical modulation layer which is not a liquid crystal cell, formed or placed in a predetermined modulation pattern having a first side opposite from the second side of said second polarization separating element; and
- a light reflecting layer placed on a second side of said optical modulation layer opposite from said first side of said optical modulation layer,
- said first polarization separating element emitting a linearly polarized light component, polarized in a first direction, of light entering the second side of the first polarization separating element toward said transmitted light polarization axis changing device, and emitting a linearly polarized light component, polarized in the first direction, of light entering said first side of said transmitted light polarization axis changing device,
- said second polarization separating element transmitting a linearly polarized light component, polarized in a second direction, of the light entering said first side of said second polarization separating element from said transmitted light polarization axis changing device toward said optical modulation layer, reflecting a linearly polarized light component, polarized in a third direction different from the second direction, of the light received from said transmitted light polarization axis changing device toward said transmitted light polarization axis changing device, and emitting a linearly polarized light component, polarized in the second direction, of light entering the second side of said second polarization separating element from the first side of said optical modulation layer toward said transmitted light polarization axis changing device, and
- display pattern portions being formed at a position in a modulation pattern of said optical modulation layer corresponding to said control region in a plane, and an animation display being produced by a combination of a plurality of said display pattern portions.

9. An electronic device having the display device as claimed in claim 1.

10. An electronic device having the display device as claimed in claim 8.

* * * * *